MAGNETIC TAPE RECORDER AND REPRODUCING MACHINE

Filed Nov. 3, 1960 4 Sheets-Sheet 1

Inventor
Norman P. Knoth
By Hofgren, Brady
Wegner, Allen & Stellman
Attorneys

July 20, 1965 N. P. KNOTH 3,196,214

MAGNETIC TAPE RECORDER AND REPRODUCING MACHINE

Filed Nov. 3, 1960 4 Sheets-Sheet 2

July 20, 1965 N. P. KNOTH 3,196,214

MAGNETIC TAPE RECORDER AND REPRODUCING MACHINE

Filed Nov. 3, 1960

4 Sheets-Sheet 4

3,196,214
Patented July 20, 1965

3,196,214

MAGNETIC TAPE RECORDER AND REPRODUCING MACHINE

Norman P. Knoth, Chicago, Ill., assignor to Warwick Electronics Inc., a corporation of Delaware Filed Nov. 3, 1960, Ser. No. 67,044
15 Claims. (Cl. 179—100.2)

This invention relate to a tape recording and reproducing machine.

A principal object of this invention is to provide a tape recording and reproducing machine capable of playing or recording alternatively either tape disposed in a cartridge or wound on a reel.

Another object of this invention is to provide a tape recording and reproducing machine having magnetic recording and erase heads, guide means associated with said heads forming a tape path, means on one side of said guide means for receiving a tape cartridge, and means on the other side of said guide means for receiving a pair of tape reels.

Still another object of this invention is to provide push button means for such a tape recording and reproducing machine having push buttons for starting and stopping the operation of the machine that are common to both the tape cartridge and tape reel operations.

Another object of this invention is to provide such a machine with a shiftable yoke structure operated by push button means to shift idler wheels into alternate positions so that either one of a pair of reel spindles may be drivingly connected to reel spindle drive motors.

Another object of this invention is to provide such a tape recording machine with a means for preventing the take up cartridge spindle from turning when no cartridge is present in the machine or for preventing the reel spindle from turning when a cartridge is playing.

Still another object of this invention is to provide such a tape recording machine with a mechanical push button arrangement and linkage for setting up an automatic shut off for the machine for either cartridge or reel operation when the tape on the cartridge or on the reels has been exhausted.

Further objects and advantages will become apparent from the following detailed description taken in connection with the accompanying drawings, in which:

FIG. 4 is an elevational view of the tape spindle drive mechanism taken substantially along line 4—4 of FIG. 2;

Figure 1:
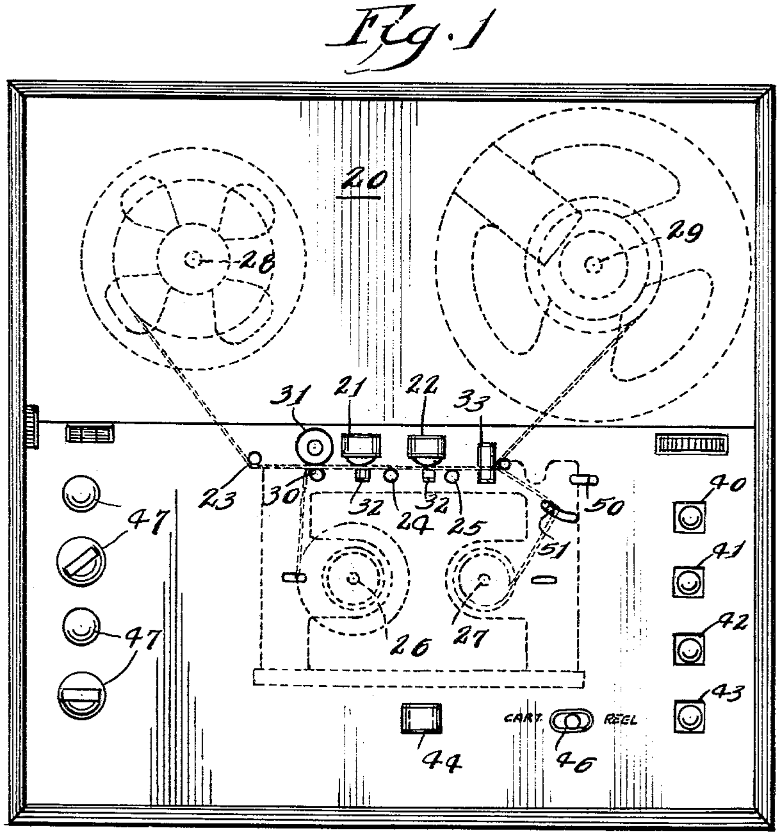
FIG. 1 is a plan view of the tape recorder and reproducing machine.

While this invention is susceptible to embodiment in many different forms, there is shown in the drawings and will herein be described in detail an embodiment of the invention with the understanding that the present disclosure is to be considered as an exemplification of the principles of the invention, and is not intended to limit the invention to the embodiment illustrated. The scope of the invention will be pointed out in the appended claims.

The tape recording and reproducing machine generally comprises a mounting plate 20 having recording and erase heads 21 and 22 centrally mounted on said plate and guide posts 23, 24 and 25 associated therewith forming a tape path. A pair of spindles 26 and 27, for receiving a tape cartridge with tape therein, are located on one side of the heads and guide posts and another pair of spindles 28 and 29, for receiving tape reels, with tape thereon, are located on the other side of the heads and guide posts. As a result, either a tape cartridge or tape reel, alternatively, may have the associated tape positioned in playing relation with the recording and erase heads along the tape path.

The elements associated with the recording and erase heads to form the tape path are shown in FIG. 1 as comprising, a tape drive capstan 30 for driving the tape located on one side of the tape path and having a shiftable pressure roller 31 mounted directly opposite the capstan 30 and on the other side of the tape path to hold the tape in driving contact against the capstan. Shiftable pressure pads 32 are located directly opposite the recording and erase heads to hold the tape in operating contact against the heads and a housing 33 having an opening in line with the tape path is provided with a switching arrangement for shutting off the machine when the tape on the reels has been exhausted, as more fully described hereinafter. The dotted lines shown in FIGURE 1 designate the positions of both the tape cartridge and tape reels on their associated spindles and the tape path for either operation, it being understood that only one or the other is utilized at one time.

To operate the tape recording and reproducing machine, four push buttons are provided on top of and adjacent one side of the mounting plate 20 and consist of a play button 40 usable in conjunction with either a tape cartridge or tape reels, a rewind button 41 for "fast rewind" operation of the tape reels, a forward button 42 for "fast forward" operation of the tape reels and a stop button 43 for stopping the operation of either the tape reels or the tape cartridge and which will release any of the other push buttons that are in a depressed position. A push button 44, centrally located in front of the tape cartridge spindles is used for rewinding the tape in the cartridge and a selector switch 46 is provided adjacent push button 44 having a position for reel operation and a position for cartridge operation. Various controls 47 for operating the amplifier portion of the tape recording and reproducing machine and supplying power to the unit are mounted on the mounting plate 20 on the side opposite the four push buttons 40–43.

A movable feeler pin 50, positioned to move relative to the mounting plate 20 adjacent the side of the cartridge senses the presence of the cartridge and is shifted to the right when the cartridge is placed in position on spindles 26 and 27. A second feeler pin 51 is within the tape path of the cartridge tape and as the diameter of the tape coil on the spindle 27 diminishes, the feeler 51 shifts to the left indicating the end of the cartridge tape play. The operation of feeler pins 50 and 51 will be described in detail later.

Figure 2:
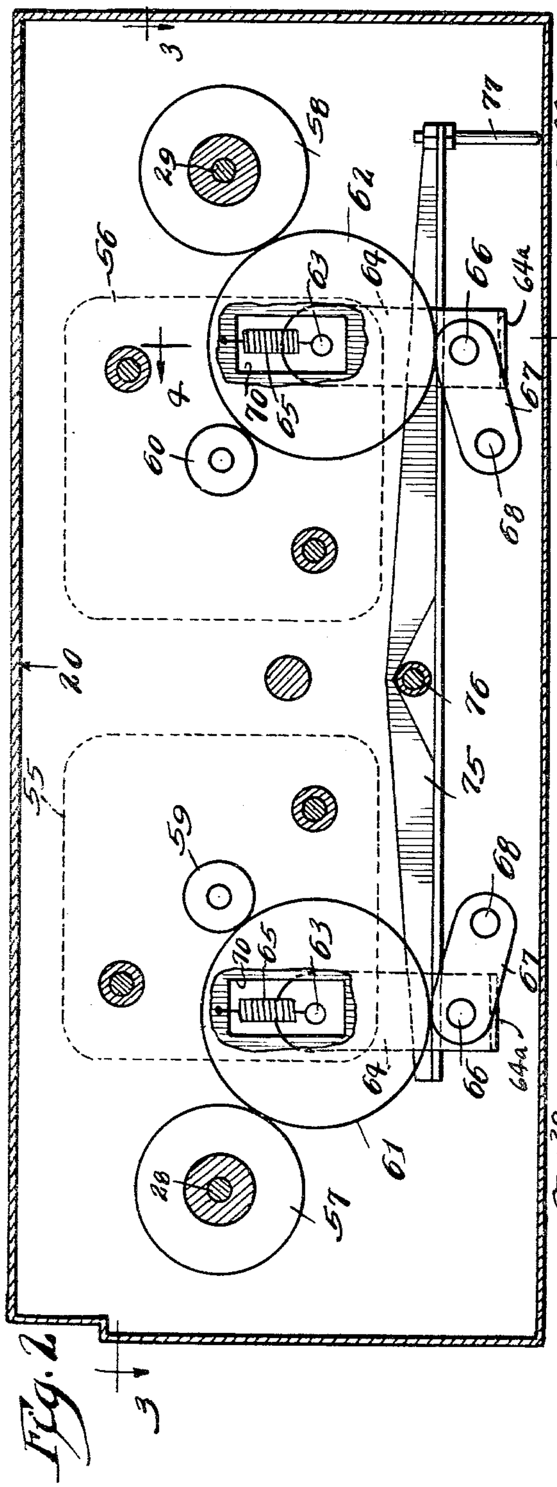
FIG. 2 is a partial plan view of the tape recorder and reproducing machine with the top plate removed showing the tape spindle drive mechanism.
Figure 3:
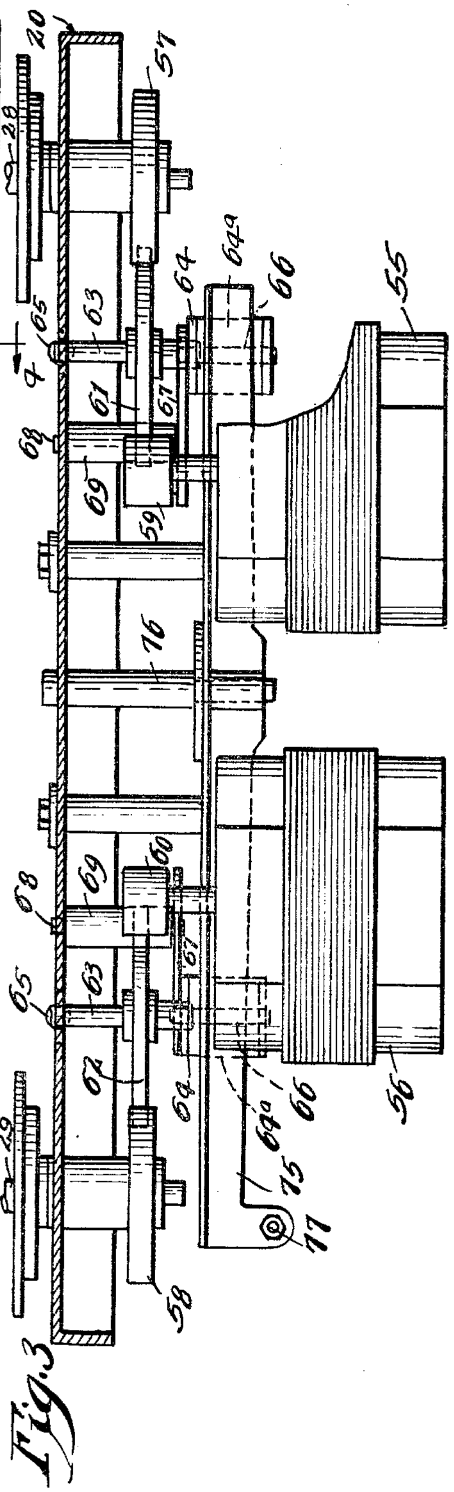
FIG. 3 is an elevational view of the tape spindle drive mechanism taken substantially along the line 3—3 of FIG. 2.

To drive the tape reel spindles 28 and 29 a pair of electric motors 55 and 56 are mounted to the underside of the mounting plate 20 adjacent each of the spindles, see FIGS. 2, 3 and 4. The spindles extend through to the underside of the mounting plate 20 and are provided with pulleys 57 and 58 at their lower ends. The drive shafts of motors 55 and 56 have pulleys 59 and 60 at their ends which are substantially in the same horizontal plane as the pulleys 57 and 58. A pair of idler wheels 61 and 62 are positioned in the same plane as the spindle and motor drive shaft pulleys and normally have their outer peripheries in contact with the outer peripheries of the spindle and motor pulleys forming a driving connection therebetween. Each idler wheel is supported by a shaft 63 extending through the center thereof, having its lower end connected to one end of a flat elongated link 64 and its upper end affixed to a tension spring 65. The other end of the flat elongated link 64 is bent downwardly into a U-shaped configuration 64*a* and has a vertical pin 66 extending through both sides thereof pivotally connecting one end of a flat link 67 to the upper side of link 64. The other end of link 67 is pivotally connected by a pin 68 and a sleeve 69 to the mounting plate 20 as shown in FIG. 4. The mounting plate 20 has cut out portions 70 located above the idler wheels 61 and 62 and the tension springs 65 are positioned within these cut outs and their free ends affixed to the mounting plate 20 urging the idler wheels 61 and 62 into contact with the spindle pulleys 57 and 58 and the motor pulleys 59 and 60, respecively, to form the driving connection.

Means to shift the idler wheels 61 and 62 into and out of driving relation with the reel spindles and drive motors comprises an elongated yoke bar 75 pivoted near its center by a pin 76 on the mounting plate 20 in a position that is generally intermediate the idler wheels and having its end portions associated with the end U configuration portions 64*a* of the links 64 and almost in contact with the pins 66. One end of the yoke bar 75 extends outwardly a distance beyond one of the pins 66 and has an elongated rod 77 affixed at right angles thereto.

Figures 5, 6, 8, 9, 10:
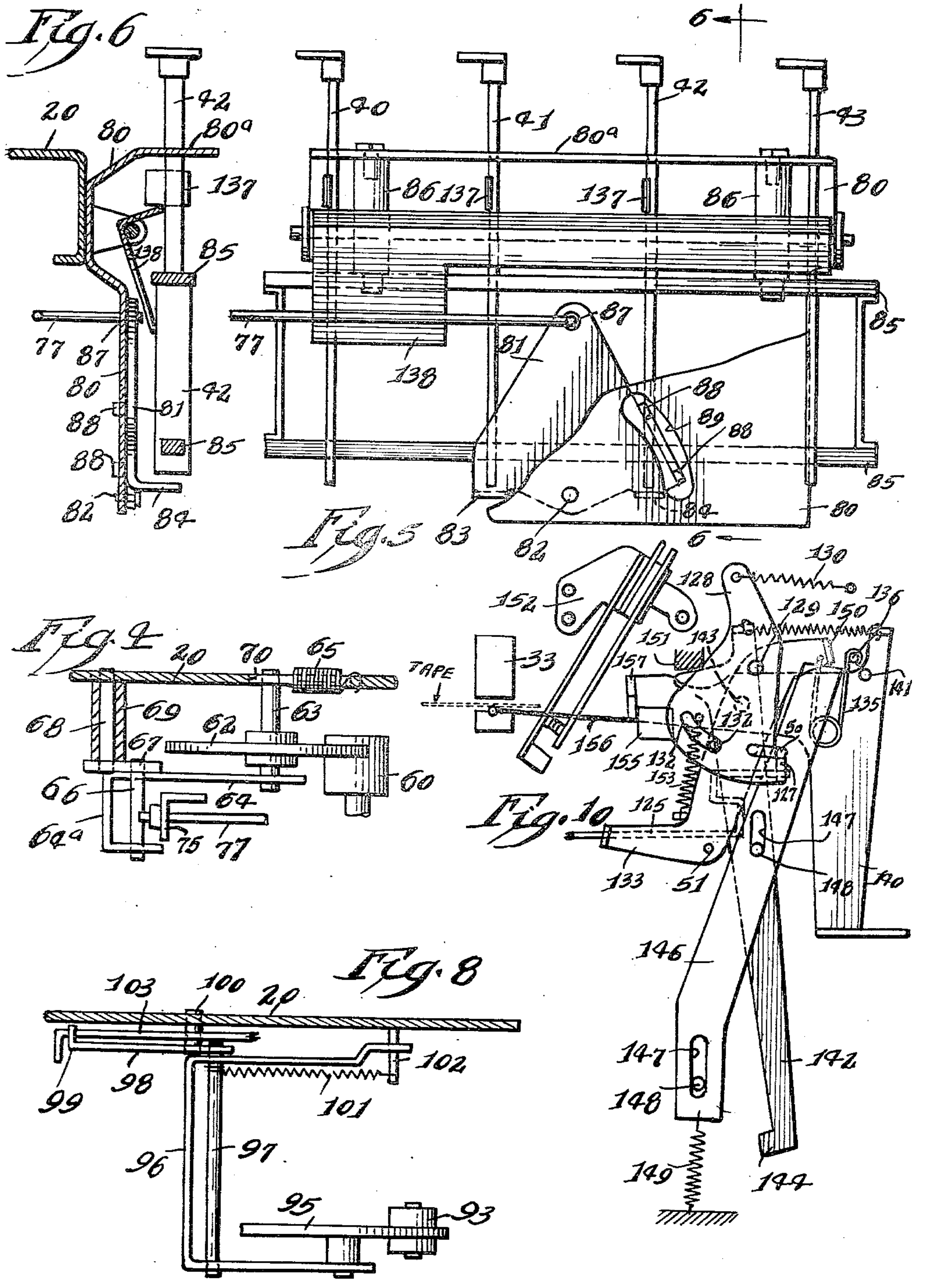
FIG. 5 is an elevational view partly in section of the push button mechanism taken substantially along line 5—5 of FIG. 7.
FIG. 6 is an elevational view of the push button mechanism taken substantially along line 6—6 of FIG. 5.
FIG. 8 is a partial elevational view of the cartridge drive mechanism taken substantially along line 8—8 of FIG. 7.
FIG. 10 is a partial view of the linkage shown in FIG. 7 but showing the linkages in operating position.

FIGS. 5 and 6 show means for shifting the yoke bar 75 which comprise a bent plate 80 affixed to the side of mounting plate 20 and extending downwardly at right angles thereto. A triangular plate 81 is pivotally mounted to the plate 80 by a rivet 82, located generally midway its base and adjacent the edge of the plate 80, and has end tab portions 83 and 84 of its base bent outwardly at right angles thereto. A push button supporting structure 85 is secured to the bent top 80*a* of plate 80 by pins 86 and receives the four push buttons 40, 41, 42 and 43. Push buttons 41 and 42 are positioned so that their lower ends are located just above and normal to the tabs 83 and 84. The rod 77 which has one end connected to the yoke bar 75 has its other end 87 pivotally connected to the apex of plate 81.

As previously mentioned, the idler wheels 61 and 62 are normally spring urged into contact with the spindle and motor shaft pulleys forming a driving connection therebetween. When tape reel operation is desired the selector switch 46 is placed in the reel position and the play button 40 depressed, supplying power to the reel drive motor 55, and driving spindle 28 through the idler wheel 61, thereby winding the tape on the take-up reel located on the spindle 28. It should be noted that the other drive motor 56 is not energized at this time but the idler wheel 62 remains in driving contact with the motor pulley 60 and the spindle pulley 58, acting as a drag for spindle 29 and restricting the pay out of tape from its associated reel. When it is desired to have a fast forward tape movement the stop push button 43 is depressed releasing the play push button from a depressed position to its normal position stopping the motor 55. The fast forward push button 42 is then depressed supplying power to the motor 55 and pivoting the triangular shaped plate 81 clockwise about its pivot point 82 moving rod 77 to the right (see FIG. 5) as the end of the push button 42 engages the tab 84. As the rod 77 is moved to the right the elongated yoke bar 75 rotates clockwise about the pivot pin 76 (FIG. 2) causing the end of the bar 75 to contact the pin 66 associated with idler wheel 62 and moves the idler wheel out of driving engagement with the spindle and motor drive shaft pulleys 58 and 60. The drag on the spindle 29 is thereby removed and the spindle 28 rotates at an increased speed to provide a fast forward movement of the tape. Depressing the stop button 43 will release button 41, cutting off power to the drive motor 55 and returning the idler wheel 62 to its normal position. At the same time depression of the stop button 43 applies D.C. voltage to the reel motors 55, 56 for braking. In the same manner, when the rewind button 41 is depressed, its end engages the tab 83 pivoting plate 81 in a counterclockwise direction, moving rod 77 to the left (FIG. 5) which in turn pivots the elongated bar 75 counterclockwise (FIG. 2) disengaging the idler wheel 61 from contact with the spindle and motor drive shaft pulleys 57 and 59. At the same time power is applied to the drive motor 56 and spindle 29 is rotated at full speed without any restriction or drag providing a fast rewind operation. In order to restrict the clockwise or counterclockwise movement of the triangular plate 81 outwardly extending tabs 88 are provided on one side of the plate that move in an arcuate slot 89 provided in the plate 80, the ends of the slot limiting the movement of the tabs 88.

Figure 7:
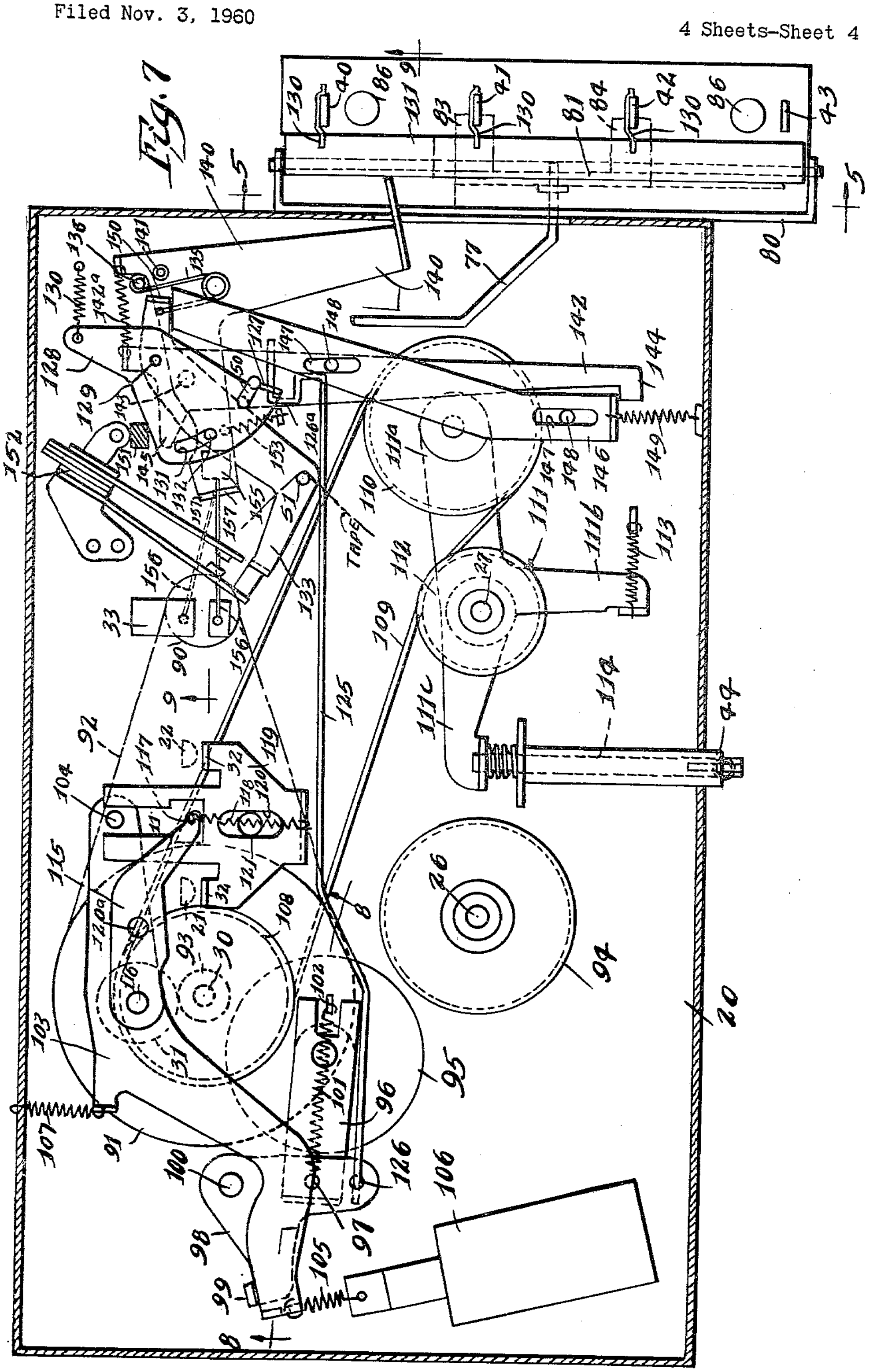
FIG. 7 is a partial plan view of the tape recording machine with the top plate removed showing the operating linkages in their normal positions.

FIGS. 7 and 8 show the driving means for the capstan and the tape cartridge spindles which comprise a motor driving pulley 90 driven by an electric motor (not shown) and a driven pulley 91, mounted on the capstan shaft 30, drivingly connected to the pulley 90 by a belt 92. A small pulley 93 is also connected to the capstan 30 beneath the pulley 91 and turns therewith. A pulley 94 is affixed to the tape cartridge spindle 26 on the underside of the mounting plate 20, located in the same horizontal plane as the pulley 93 and freely rotatable with the spindle 26. An idler wheel 95 is rotatably mounted on a U shaped bracket 96 so that it is in the same horizontal plane as the pulleys 93 and 94. The bracket 96 is pivotally connected by a pin 97 to one arm of a bell crank 98 which has an upwardly turned tab 99 at the end of its other arm and is pivotally mounted to the mounting plate 20 by a pin 100. A tension spring 101 has one end connected to the pin 97 and the other to a tab 102 fixed to the mounting plate 20 and acts to urge the idler wheel 95 into peripheral driving contact with pulleys 93 and 94.

Still referring to FIGS. 7 and 8, a means for moving idler wheel 95 in and out of driving contact with the pulleys 93 and 94 comprises an S shaped link 103 having one end pivotally mounted to the mounting plate 20 by a pin 104 and the other end connected by a spring 105 to the plunger of an electric solenoid 106 which is normally in an extended position, as shown in FIG. 7, as urged by a tension spring 107 connected to link 103 at a point generally midway between the two ends. The end section of link 103 that is connected to the solenoid 106 lies directly above the bell crank 98 and has a portion of its side in direct contact with the upwardly extending tab 99 to move the bell crank in a clockwise direction about pivot point 100 due to the urging of spring 107 which is stronger than and opposed to the spring 101; therefore, in its normal position the bell crank 98 is urged clockwise holding the idler wheel 95 out of driving engagement with the pulleys 93 and 94. When the solenoid 106 is energized as hereinafter described, the idler 95 is caused to shift and complete the drive to cartridge spindle 26.

Means for rewinding tape on the cartridge spindle 27 and shown in FIG. 7 comprise, a pulley 108 mounted directly above the pulley 91, integral with the capstan 30 and rotatable therewith. A belt 109 loosely connects pulley 108 with a pulley 110 that is rotatably mounted on the end of a first arm 111*a* which is part of a three arm link 111. The belt 109 does not have sufficient tension to form a driving connection between the two pulleys and normally slips thereon. The link 111 is pivotally mounted at its center about the lower end of the cartridge spindle shaft 27. A pulley 112 is affixed to the cartridge spindle 27 below the link 111, in the same plane as pulleys 108 and 110 and having its outer periphery in near contact with the belt 109. A spring 113 is affixed to the end of a second arm 111b urging the link 111 counterclockwise and a third arm 111c is mechanically connected to the push button 44. Depressing the push button 44 shifts a rod 114 which pivots the link 111 clockwise about the spindle 27.

In cartridge operation, the selector switch 46 is placed in the cartridge position and the play button 40 is depressed. Depressing the play button 40 energizes the electric solenoid 106. This causes the solenoid plunger to move inward, pivoting the link 103 in a counterclockwise direction against the urging of the spring 107, removing the restriction against tab 99 and allowing the bell crank 98 to move counterclockwise due to the urging of spring 101 so that the idler pulley 95 engages the pulleys 93 and 94 forming a driving connection therebetween causing the cartridge spindle 26 to rotate and the tape to travel onto the pickup reel. To rewind the tape in the cartridge after it has been played, after the cartridge spindle 26 has been automatically stopped as will later be described, the cartridge rewind button 44 is depressed, pivoting the link 111 and the pulley 110 in a clockwise direction, bringing the belt 109 against the outer periphery of the pulley 112 and tightening said belt so that it creates a driving connection thereby rotating the pulley 112 and spindle 27 to rewind the tape on the cartridge rewind reel. Releasing the push button 44 causes the link 111 and the pulley 110 to pivot counterclockwise due to the urging of spring 113, moving the belt 109 away from the periphery of pulley 112, releasing the tension created in the belt so that it again slips on the pulleys 108 and 110.

The means required to shift the pressure roller 31 against the capstan 30 and to shift the pressure pads 32 against the recording and erase heads 21 and 22, comprises, a link 115 fastened at one end to a pin 116 that rotatably supports the pressure roller 31 above the mounting plate 20 and has its lower end secured to the link 103. The other end of link 115 is provided with a downwardly extending tab 117 to which one end of a spring 118 is fastened with the other spring end being secured to the end portion of a shiftable yoke plate 119 that has pressure pads 32 affixed thereto and which is provided with a slot 120 that receives a fixed pin 121 for guiding the plate during movement. The link 115 is also pivoted at its midpoint to the mounting plate 20 by a rivet 120*a*. Shifting the pressure roller 31 and the pressure pads 32 is accomplished by operating the play button 40 which energizes the solenoid 106 through a circuit (not shown) and pivots the link 103 in a counterclockwise direction thereby moving the pressure roller 31 against the capstan 30. At the same time the link 115 moves counterclockwise about the pivot 120*a*, tensioning the spring 118 and causing the yoke plate 119 to move towards the heads 21 and 22 thereby bringing the pressure pads 32 yieldably against the heads. Depressing the stop button 43 releases the play button 40 de-energizing solenoid 106 and allowing the pressure roller and the pressure pads to assume their normal position.

In reel operation, the selector switch 46 is placed in the reel position, and the play button 40 is depressed, supplying power to the spindle reel drive motor 55 driving the reel spindle 28, and the direct current solenoid 106 is energized, shifting the pressure roller and pressure pads into playing position with the capstan and the magnetic heads. Since it is not necessary to drive the cartridge spindle 26 while a tape reel is being played, means are provided for preventing the idler wheel 95 from driving the cartridge spindle 26 when a tape cartridge is not present on the machine even though the direct current solenoid 106 is energized. Such means consist of an elongated rod 125 having one end pivotally attached to an arm of the bell crank 98 at point 126 and a portion of the other end formed into an S shaped configuration having a part 126*a* engaging a tab 127 which is part of a generally triangular shaped link 128. The link 128 is pivoted to the mounting plate 20 by a pin 129 and has the cartridge sensing pin 50 fixed to its top surface adjacent the tab 127 and extending upwardly beyond the top of the mounting plate 20 through a suitable slot. A spring 130 has one end attached to the upper corner of the link 128 and the other end fixed to the mounting plate 20 thereby urging the link 128 and the tab 127 clockwise and preventing lateral movement of the rod 125 (see FIG. 7). The idler wheel 95 is thereby held out of driving engagement with pulleys 93 and 94 by the rod 125 even though the direct current solenoid 106 has been energized since the spring 130 that prevents the lateral movement of rod 125 is stronger than the spring 101 that urges the idler wheel into driving engagement. The cartridge spindle 26 will now remain stationary even though the play button is depressed to drive the capstan and energize solenoid 106 to shift the pressure roller and pressure pads as required to play a tape reel on the machine.

An automatic means is provided for shutting off the machine at the end of a tape in either the cartridge or reel operation. Mechanism employed for the cartridge shut off will now be described. The installation of a cartridge on the tape cartridge spindle will engage the cartridge sensing pin 50 which is fastened to the link 128, move the pin to the right and rotate the link counter clockwise about the pivot point 129 (FIG. 7). A slotted hole 131 is provided in the link 128 and receives a short pin 132 that is free to move in the slot and which is fastened to an S shaped link 133 that is mounted directly below the link 128 and also pivoted on the pin 129. A scissor spring 135 has one end fastened to the upper arm of link 133 and the other end secured to a pin 136 on the mounting plate 20 producing an over center condition on the link 133. Looking now to FIG. 9, when the play button 40 is depressed a projecting tab 137 mounted on the plunger engages a hinged actuator 138 forcing the upper leg of the actuator downward and moving the lower leg to the left so that it engages and moves a bell crank arm 140 in a clockwise direction about a rivet 141 that pivotally connects bell crank to the mounting plate 20. Referring again to FIG. 7, an elongated link 142 having its upper portion pivotally fastened to the left arm of the bell crank lever 140 by a pivot rivet 143, has its lower end formed into a hooked configuration 144, and a short arm 145 extending from the upper portion of the link 142 at right angles thereto. The link 142 is normally urged in a clockwise direction about its pivot by a spring 142*a* affixed to its upper end and to the upper end of bell crank 140. As the lower leg of the hinged actuator moves to the left the bell crank 140 moves clockwise and the link 142 moves upward, as viewed in FIG. 7. The hooked portion 144 engages the lower end of a slider arm 146 that is provided with slots 147 which receives guide pins 148 that are mounted on plate 20 for guiding the slide arm. A spring 149 affixed to the bottom end of the slider 146 urges it into a normal downward position, as viewed in FIG. 7. As the slider 146 moves upward due to the action of the link 142 its upper end engages an upwardly extending ear 150 of the link 133 and rotates link 133 counterclockwise about its pivot 129 past the overcenter condition created by the scissor spring 135 so that it is held in the counterclockwise position by the scissor spring. As the link 142 moves upward, the short arm 145 engages a fixed stop 151, the link will pivot counterclockwise and the hooked portion 144 will become disengaged from the slider 146. A switch 152, located adjacent the link 133, is placed in series with the electrical solenoid 106 by moving the selector switch 46 to the cartridge position. The switch is biased in a closed position and is normally held in an open position by the lower end portion of link 133 as shown in FIG. 7. As the link 133 pivots counterclockwise when the play button is depressed, the switch 152 is biased closed, energizing the solenoid 106 and allowing the cartridge spindle 26 to turn if a cartridge is present in the machine. FIG. 10 shows the relative positions of the link and the switch 152 after the play button 40 has been depressed.

In operation the feeler pin 51 which is fastened to the link 133 extends upward through the mounting plate 20 and is located within the cartridge and within the path of the tape. The tape is positioned around the right side of pin 51 as shown in FIGS. 1 and 7 and when the play button is depressed and the link 133 moved counterclockwise, the feeler 51 will move to the right. As the diameter of the tape coil on the spindle 27 diminishes the tape feeler 51 will be pulled toward the left by the tape, moving link 133 clockwise past the over center condition created by the scissor spring 135 and engages the tape shut off switch 152, snapping it open, de-energizing solenoid 106 and disengaging the drive means for the cartridge spindle 26. The stop button may then be depressed, releasing the start button and allowing the bell crank 140 to move counterclockwise due to the urging of a spring 153 attached to its left arm and assume its normal position, as seen in FIGURE 7.

Figure 9:
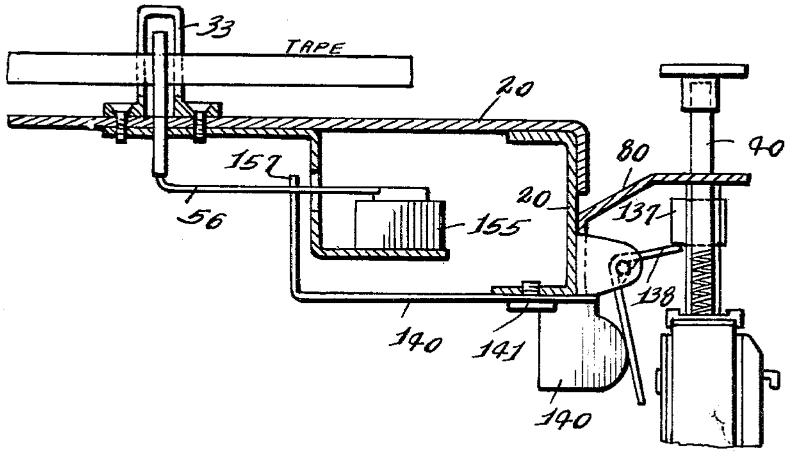
FIG. 9 is an elevational view of the push button mechanism taken substantially along line 9—9 of FIG. 7.

FIGURES 7 and 9 show the means for sensing the end of play of a tape in reel operation and shutting off the machine which comprise a switch 155 having an elongated wire contact arm 156 biased in an open position as shown by the dotted line in FIGURE 7. In the normal position of the operating linkage an upwardly extending tab 157 of link 140 holds the contact arm 156 in a counterclockwise direction keeping the switch 155 in a closed position. When using the recording machine for reel operation the selector switch 46 is put into reel position placing the tape shut off switch 155 in series with the alternating current power supply to the machine and transfers the control of the solenoid 106 directly to the play plunger 40 by removing the switch 152 from the circuit. The tape from the tape reel is placed in the tape path passing through the housing 33 and started on the take up reel located on spindle 28. The play button 40 is then depressed moving the link 140 and the tab 157 in a clockwise direction releasing the switch arm 156 and allowing it to move clockwise toward its biased position; but the clockwise movement is restricted by the presence of the tape and the switch arm 156 will rest against the tape maintaining the switch 155 in a closed position. When the end of the tape passes through the housing 33 there is no further restriction to the clockwise movement of the arm 156 and it will move to the position shown by the dotted line in FIG. 7, opening the switch 155, cutting off the power and stopping the machine. Depressing the stop button 43 releases the play button and allows bell crank 140 and tab 157 to move counterclockwise closing switch 155.

The above described arrangement allows the operator to play either a tape reel or a cartridge on the machine. The play push button and the stop push button are common to both types of operation and the only requirement on the part of the operator to provide for either reel or cartridge play is to operate the selector switch 46 to either the cartridge or the reel position and then utilize the push buttons provided to select the desired play.

I claim:

1. A magnetic tape recording and reproducing machine comprising: a mounting member; means comprising magnetic heads centrally mounted on said member and defining a tape path; means for securing a tape cartridge in place on said member to one side of said tape path with tape extending therefrom along said tape path and in operative relation with said head; and means on said member at the side of the tape path opposite to said cartridge securing means for receiving a pair of tape reels with tape positionable along said tape path and in operative relation to said heads, said last named means being arranged so as to allow said tape reels to be present on said machine simultaneously with said cartridge when the tape of said tape reels is not positioned in said tape path.

2. The tape recording and reproducing machine of claim 1 wherein the heads are each provided with a backing element for holding the cartridge tape against said heads when a cartridge is present in the machine and for holding the reel tape against said heads when tape reels are present in the machine.

3. A tape recording and reproducing machine of claim 1 wherein a tape drive capstan is mounted on said mounting members, and a shiftable pressure roller is associated with the tape drive capstan for holding the cartridge tape against said capstan and in driving contact therewith when a cartridge is present in the machine and for holding the reel tape against said captan when tape reels are present in the machine.

4. A magnetic tape recording and reproducing machine comprising: a mounting plate; magnetic heads and guide devices centrally mounted on said plate defining a tape path; a tape drive capstan mounted on said plate for driving a tape along said tape path; a cartridge spindle on said plate to one side of said tape path adapted to receive a cartridge with tape in operative relation to said captan and heads; drive means for said capstan; and a pair of reel spindles mounted on said plate at the side of said tape path opposite said cartdidge spindle for receiving tape reels with a tape positionable along said tape path, said reel spindles being arranged so as to allow said tape reels to be present on said machine simultaneously with said cartridge when the tape of said tape reels is not positioned in said tape path.

5. A magnetic tape recording machine comprising: a mounting plate; magnetic recording and erase heads centrally mounted on the top of said plate; guide means mounted on the plate adjacent said magnetic heads, and with said magnetic heads defining a tape path; a drive capstan for driving said tape disposed along said tape path; a cartridge spindle mounted on said plate at one side of said tape path for receiving a tape cartridge with a tape therein and part thereof along said path in driving and playing relation with said capstan and recording and erase heads; tape reel spindles mounted on said plate at the other side of said tape path for receiving tape reels with a tape positionable along said tape path in driving and playing relation with said capstan and recording and erase heads when no cartridge is present in the machine, said reel spindles being arranged so as to allow said tape reels to be present on said machine simultaneously with said cartridge when the tape of said tape reels is not positioned in said tape path; driving means for said cartridge spindle, said capstan and said tape reel spindles; and mechanical operating means for driving either one of said tape spindles or said cartridge spindle.

6. A magnetic tape recording machine comprising: a mounting plate; magnetic recording and erase heads centrally mounted on said plate; guide means mounted on the plate adjacent to said magnetic heads and defining a tape path therewith; a drive capstan for driving said tape along said tape path; a pair of cartridge spindles mounted on said plate to one side of said heads and guide means for receiving a tape cartridge with tape disposed along said tape path in drviing and playing relation to said capstan and heads; a pair of reel spindles mounted on said plate on the other side of said heads and guide means for receiving a pair of tape reels with tape positionable along said tape path in driving and playing relation with said capstan and heads when no cartridge is in the machine, said reel spindles being arranged so as to allow said tape reels to be present on said machine simultaneously with said cartridge when the tape of said tape reels is not positioned in said tape path; shiftable backing elements associated with the recording and erase heads for holding the tape in playing contact against said heads; means for driving said capstan and either a cartridge spindle or a reel spindle; and means for shifting said backing elements in playing contact against said heads.

7. In a magnetic tape recording machine comprising: a mounting member; recording and erase heads, and tape guide devices on said member defining a tape path; a pair of tape reel spindles mounted on said plate to one side of said head and guide devices for receiving a pair of tape reels with tape thereon; a pair of electric motors mounted on said plate associated one with each of said spindles; a pair of idler wheels pivotally mounted on said plate associated one with each of said motors and said spindles to provide a driving relation therebetween; spring means urging said idler wheels into engagement with their associated motor shaft and tape reel spindles; and means for releasing at least one of said idler wheels from driving relation with the respective spindles.

8. In a magnetic tape recording machine comprising: a mounting plate; magnetic heads, and tape guide devices mounted on said plate defining a tape path; a pair of tape reel spindles mounted on said plate to one side of said head and guide devices for receiving a pair of tape reels; a pair of electric motors mounted on said plate each of said motors having a shaft associated with one of said spindles; a pair of idler wheels pivotally mounted on the underside of said plate, each of said wheels associated with one of said driving motor shafts and one of said spindles and spring urged into contact with the shaft of said motor and said spindle to provide a driving contact therebetween; and mechanical means for selectively positioning said idler wheels in and out of driving relationship with their associated motor shaft and tape reel spindle to place either one or both of said idler wheels in contact with said motor shafts.

9. A magnetic tape recording machine comprising: a mounting member; magnetic heads and guide members centrally mounted on the top of said member defining a tape path; a driven capstan for driving said tape mounted along said tape path; cartridge spindles for receiving a tape cartridge mounted on said member to one side of the heads and guide members; tape reel spindles for receiving a pair of tape reels with tape thereon and positionable along said tape path, said reel spindles being mounted on said member on the other side of said heads and guide members and arranged so as to allow said tape reels to be present on said machine simultaneously with said cartridge when the tape of said tape reels is not positioned in said tape path; means including an electric motor for driving a cartridge spindle and the capstan, means including another electric motor for driving a tape reel spindle; and mechanical operating means, including a plurality of push buttons to control both the cartridge and tape reel operation, one of said push buttons being utilized to start said other motor and drive a tape reel spindle in reel operation and to drivingly connect one of said cartridge spindles in cartridge operation, and another of said push buttons being utilized to stop said other motor in reel operation and to drivingly disconnect said one cartridge spindle in cartridge operation.

10. A magnetic tape recording machine comprising: magnetic heads and guide devices defining a tape path; a capstan for driving said tape mounted along said tape path; cartridge spindles including a take up spindle and a pay out spindle on one side of the heads and guide devices for receiving a tape cartridge; tape reel spindles on the other side of said heads and guide devices for receiving tape reels containing tape thereon; driving means, including an electric motor for both the cartridge spindles and the capstan, and another electric motor for each of said reel spindles; mechanical operating means, including a plurality of push buttons to control the operations of said driving means, one of said push buttons being utilized to start one of said other motors when said machine is in a condition for playing the tape reels; and means for preventing the cartridge take up spindle from turning when a tape reel is being played and a cartridge is not present in the machine and for preventing the reel spindle from turning when a cartridge is being played.

11. A magnetic tape recording and reproducing machine comprising: magnetic head and guide devices defining a tape path; a drive capstan mounted along said tape path for driving a tape; a pair of cartridge spindles including a take up spindle and a pay out spindle to one side of said head and guide devices; a pair of reel spindles to the other side of said head and guide devices for receiving a pair of tape reels, said reel spindles being arranged so as to allow said tape reels to be present on said machine simultaneously with said cartridge when the tape of said tape reels is not positioned in said tape path; driving means including an electric motor for driving each of said reel spindles, and another electric motor for driving both said capstan and said cartridge spindles; and means operative during either cartridge or reel operation for sensing the end of play of a tape from either the cartridge or a tape reel and automatically stopping said driving means.

12. In a magnetic tape recording machine comprising: a mounting plate; magnetic heads, and tape guide devices mounted on said plate defining a tape path; a pair of tape reel spindles mounted on said plate to one side of said head and guide devices for receiving a pair of tape reels; a pair of electric motors mounted on said plate each of said motors having a shaft associated with one of said spindles; a pair of idler wheels pivotally mounted on the underside of said plate, each of said wheels associated with one of said driving motor shafts and one of said spindles and spring urged into contact with the shaft of said motor and said spindle to provide a driving contact therebetween; and mechanical means for selectively positioning said idler wheels in and out of driving relationship with their associated motor shaft and tape reel spindle to place either one or both of said idler wheels in contact with said motor shafts, said mechanical means comprising a plurality of push buttons; a pivot plate associated with and pivotal in either of two directions by said push buttons; an elongate yoke bar pivoted at its midpoint to said mounting plate and having its end portions operatively associated one with each of the idler wheels; an elongated member having one end connected to said pivot plate and having the other end connected to said yoke bar, whereby pivoting said plate will pivot said yoke bar to move either one or the other of said idler wheels out of contact with said motor shafts and tape spindles.

13. A magnetic tape recording machine comprising: magnetic heads and guide device defining a tape path; a capstan for driving said tape mounted along said tape path; cartridge spindles including a take up spindle and a pay out spindle on one side of the heads and guide devices for receiving a tape cartridge; tape reel spindles on the other side of said heads and guide devices for receiving tape reels containing tape thereon; driving means, including an electric motor for both the cartridge spindles and the capstan, and another electric motor for each of said reel spindles; mechanical operating means, including a plurality of push buttons to control the operations of said driving means, one of said push buttons being utilized to start one of said other motors when said machine is in a condition for playing the tape reels, means for preventing the reel spindle from turning when a cartridge is being played; and means for preventing the take up cartridge spindle from turning when a tape reel is being played and a cartridge is not present in the machine inclding; a shiftable cartirdge sensing pin, a pivotal plate affixed to said sensing pin, a shiftable idler wheel spring urged into driving relation with said driven capstan and said cartridge take up spindle, an elongate member having one end connected to said pivotal plate and the other end operatively associated with said idler wheel holding said idler wheel out of driving relation with the driven capstan and the cartridge spindle when a cartridge is not present in the machine, whereby when a cartridge is present in the machine, said cartridge contacts and shifts said sensing pin, pivoting said pivotal plate, permitting movement of said elongated rod, and allowing the spring urged idler wheel to come into driving contact with said driven capstan and said cartridge take up spindle.

14. A magnetic tape recording and reproducing machine comprising: magnetic head and guide devices defining a tape path; a drive capstan mounted along said tape path for driving a tape; a pair of cartridge spindles including a take up spindle and a pay out spindle to one side of said head and guide devices; a pair of reel spindles to the other side of said head and guide devices for receiving a pair of tape reels; driving means including an electric motor for driving each of said reel spindles, and another electric motor for driving both said capstan and said cartridge spdinles; and means operative during either cartridge or reel operation for sensing the end of play of a tape from either the cartridge or a tape reel and automatically stopping said driving means, said last named means including a shiftable sensing pin located within the path of the cartridge tape, a pivotal plate having an arm thereon affixed to said sensing pin, an electrical switch controlling the rotation of said take up spindle, said switch being operatively associated with said pivotal plate and biased to a closed position when the machine is operating, means for positioning said tape to one side of said sensing pin to shift said sensing pin and said pivotal plate as the tape nears its end of play bringing said arm into contact with said switch to open said switch and stop the cartridge spindle from turning when the cartridge tape has reached its end of play.

15. A magnetic tape recording and reproducing machine comprising: magnetic head and guide devices defining a tape path; a drive capstan mounted along said tape path for driving a tape; a pair of cartridge spindles including a take up spindle and a pay out spindle to one side of said head and guide devices; a pair of reel spindles to the other side of said head and guide devices for receiving a pair of tape reels; driving means including an electric motor for driving each of said reel spindles, and another electric motor for driving both said capstan and said cartridge spindles; and means operative during either cartridge or seel operation for sensing the end of play of a tape from either the cartridge or a tape reel and automatically stopping said driving means, said last named means including an electrical switch having a switch arm located in said tape path which is biased to an open position and controlling the power to the machine, a bell-crank lever in contact with said switch arm to hold said arm in a closed position and on one side of said tape path when the machine is not operating, means for positioning said tape about said tape path and adjacent said switch arm, means including a push button for shifting said bell-crank lever away from contact with said switch arm to assume its biased open position, means for preventing said switch arm from assuming its biased open position and cutting of power to said machine when said bell crank lever has been moved out of contact therewith, including said magnetic tape lying in said tape path and restricting movement of said arm until the end of the reel tape has passed out of the said tape path indicating the end of play of the tape.

References Cited by the Examiner

UNITED STATES PATENTS

| | | | |
|---|---|---|---|
| 2,026,960 | 1/36 | Branch | 242—55 |
| 2,535,486 | 12/50 | Dank | 179—100.2 |
| 2,751,438 | 6/56 | Baer | 179—100.2 |
| 2,911,215 | 11/59 | Cousino | 179—100.2 X |
| 2,930,540 | 3/60 | Oblensky | 242—55.12 |
| 2,951,914 | 9/60 | Dubois | 179—100.22 |
| 2,998,489 | 8/61 | Riesz | 179—100.2 |
| 3,093,334 | 26/63 | Andrews | 242—55.12 |

IRVING L. SRAGOW, *Primary Examiner.*

STEPHEN W. CAPELLI, *Examiner.*